United States Patent [19]

Foster

[11] Patent Number: 4,967,182

[45] Date of Patent: Oct. 30, 1990

[54] PARKING BRAKE WARNING DEVICE FOR OVER THE ROAD TRACTOR TRAILERS

[76] Inventor: Bobby D. Foster, 403 N. Delaware, Butler, Mo. 64730

[21] Appl. No.: 399,788

[22] Filed: Aug. 28, 1989

[51] Int. Cl.$^5$ .............................................. B60Q 1/00
[52] U.S. Cl. ................................ 340/457.3; 200/81 H
[58] Field of Search ............................ 340/457.3, 457; 200/81.9 R, 83 R, 85 Q, 81 H, 83 Z

[56] References Cited

U.S. PATENT DOCUMENTS

| | | | |
|---|---|---|---|
| 3,723,968 | 3/1973 | Kelly | 340/457.3 |
| 3,903,513 | 9/1975 | Green et al. | 340/457.3 |
| 4,620,072 | 10/1986 | Miller | 200/81 H |

Primary Examiner—Joseph A. Orsino
Assistant Examiner—Frank M. Scutch, III
Attorney, Agent, or Firm—Kokjer, Kircher, Bradley, Wharton, Bowman & Johnson

[57] ABSTRACT

A warning device for generating a warning signal when the driver of an over the road tractor-trailer vacates the cab without setting the parking brake. A pressure sensor is used to sense the pressure on the air ride seat and to close an electric switch element whenever the seat is unoccupied. Another switch element is closed when the parking brake is in its release position. The two switch elements are arranged in series with a warning buzzer in a battery powered electric circuit to energize the buzzer if the seat is vacated without the parking brake having been set.

1 Claim, 1 Drawing Sheet

PARKING BRAKE WARNING DEVICE FOR OVER THE ROAD TRACTOR TRAILERS

BACKGROUND AND SUMMARY OF THE INVENTION

This invention relates generally to over the road tractor-trailers and more particularly to a device that provides a warning when the driver leaves the cab without having set the parking brake.

When a large over the road tractor-trailer is parked and the driver leaves the cab even temporarily, it is essential that the parking brake be securely set. Otherwise, the tractor-trailer can accidentally begin rolling, and this can damage or even destroy the tractor-trailer and anything in its path. There have been instances of significant property damage and severe personal injury resulting from the failure of the truck driver to set the parking brake.

Accordingly, there is a need for some way to make certain that the tractor parking brake is set whenever the operator leaves the cab. The present invention is directed to a warning device that generates a warning signal whenever the operator's seat is vacant and the parking brake is at the same time in its released position. Consequently, the driver is immediately alerted to the unsafe condition and can set the parking brake before the tractor-trailer has had a chance to begin rolling. The warning system is automatically deactivated whenever the driver's seat is occupied and also whenever the parking brake is set. Thus, the warning signal is given only when there is a potentially unsafe situation created by the parking brake being in the release position simultaneously with the driver vacating the operator's seat in the cab of the tractor.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
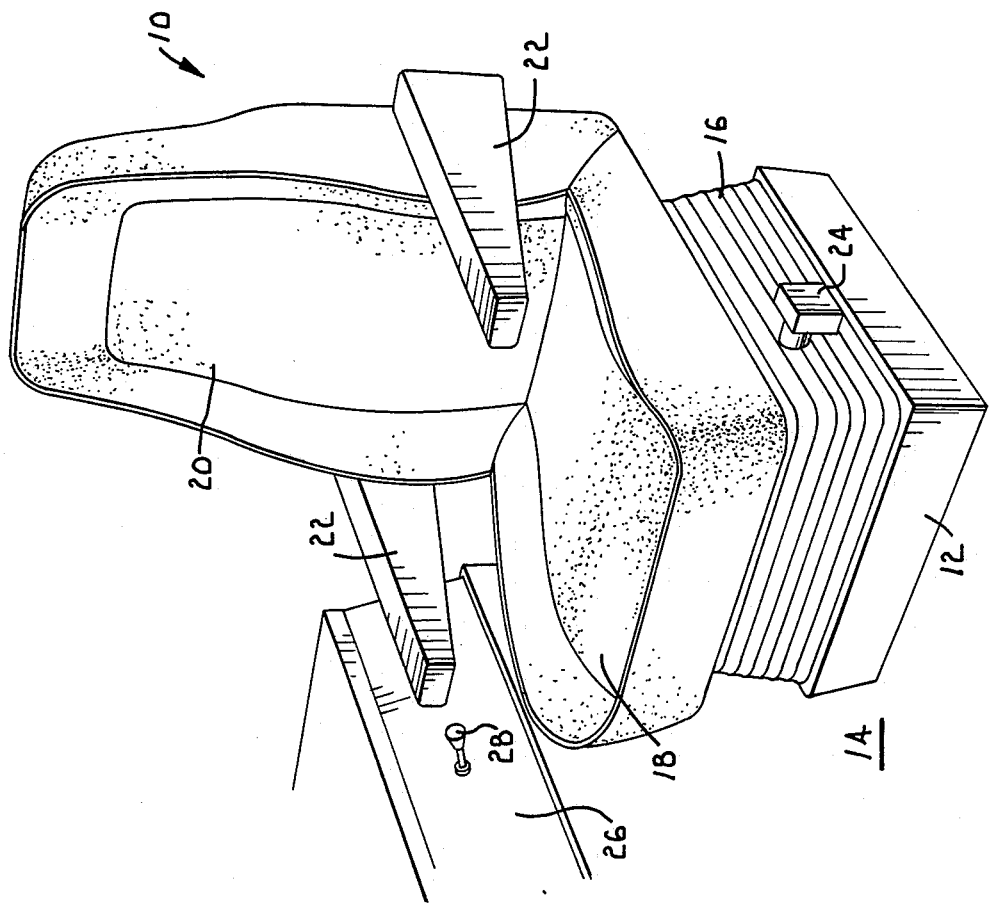
FIG. 1 is a diagramatic perspective view of an operator's seat and a portion of the control panel within a cab of an over the road tractor-trailer.

Referring now to the drawings in more detail and initially to FIG. 1, numeral 10 generally designates an operator's or driver's seat of the type commonly mounted in the cab of an over the road tractor-trailer. The seat 10 includes a rigid base 12 which is secured to the floor 14 of the cab. A bellows or accordion type pedestal 16, commonly referred to as an "air ride" pedestal, is located between the base 12 and the seat portion 18 of the seat 10. The pedestal 16 is expansible and collapsible in accordion fashion and contains air that provides the occupant of the seat 10 with a cushioned ride. In addition to the seat portion 18, seat 10 has a back 20 and a pair of arms 22.

When the seat 10 is occupied, the pedestal 16 partially collapses and the air it contains is compressed. Conversely, when the seat 10 is vacant, the pedestal 16 expands such that the air it contains is in a relatively uncompressed state. The pedestal 16 is equipped with a pressure sensor 24 which senses the pressure of the air within the pedestal for a purpose that will be explained more fully.

The cab of the tractor is equipped with a control panel 26 which is located in front of the occupant of the driver's seat 10. The console 26 includes a push/pull type parking brake control 28 which acts to set and release the conventional parking brake of the tractor-trailer. When the control 28 is pulled outwardly to the position shown in FIG. 1, the parking brake is set to prevent the tractor-trailer from rolling. When the control 28 is pushed to a retracted position, the parking brake is released, and the tractor-trailer is then able to travel.

Figure 2:
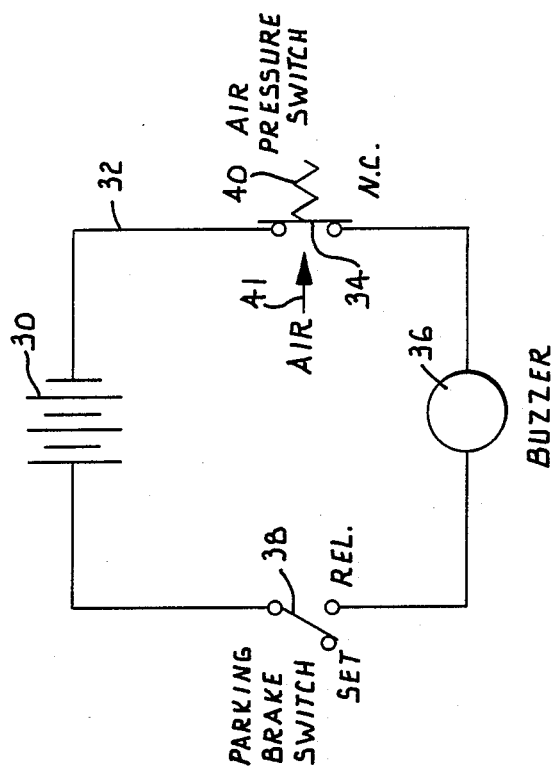
FIG. 2 is schematic diagram of an electrical circuit which controls the warning device in accordance with a preferred embodiment of the invention.

Referring now to FIG. 2, the electrical system of the tractor-trailer includes a conventional battery 30. Numeral 32 designates an electrical circuit which is connected between the terminals of the battery 30 and which includes in series an air pressure switch element 34, a buzzer device 36, and a parking brake switch element 38.

The air pressure switch 34 forms part of the pressure sensor 24 and opens and closes in response to the pressure that is sensed in the pedestal 16. A spring 40 normally urges the switch element 34 toward the closed position shown in FIG. 2. However, when the operator's seat 10 is occupied to compress the air in the pedestal 16, the increased air pressure acts against the force of the spring 40, as indicated by the directional arrow 41 in FIG. 2. This opens the switch element 34 to interrupt the circuit 32. When the seat 10 is vacant, the air pressure in the pedestal 16 is too low to overcome the force of the spring 40, and the spring maintains the air pressure switch element 34 in the closed position shown in FIG. 2.

The buzzer 36 is an electrically energized audible device which generates an audible warning signal when the electrical circuit 32 is completed. The buzzer 36 may be replaced by or used in combination with a visual warning device (not shown) or some other type of warning device.

The parking brake switch element 38 is controlled by the condition of the parking brake. When the control 28 is pulled in order to set the parking brake, the switch element 38 is in the open position shown in FIG. 2 to interrupt the electrical circuit 32. Conversely, when the control 28 is pushed inwardly to release the parking brake, the switch element 38 moves to the closed position, and the electrical circuit 32 may then be completed to energize the buzzer 36.

In use, the parking brake is normally released when the tractor-trailer is traveling on a roadway. Consequently, switch element 38 is closed. However, because seat 10 is then occupied, the air pressure switch element 34 is open, and the electric circuit is interrupted and the buzzer 36 remains de-energized.

When the tractor-trailer is parked and the driver vacates the cab, he should pull outwardly on the control 28 in order to set the parking brake. This moves the parking brake switch element 38 to the open position shown in FIG. 2, and the buzzer 36 thus remains de-energized whenever the parking brake is in the set condition. When the operator then vacates the seat 10, the air pressure switch element 34 closes. However, due to the open condition of the parking brake switch element 38, the buzzer 36 remains de-energized. When the operator returns to the cab, he occupies the seat 10 before releasing the parking brake. Consequently, switch element 34 opens before switch element 38 closes, and the buzzer 36 again remains de-energized.

In the event that the driver neglects to set the parking brake before vacating the cab, the buzzer 36 is energized in order to provide him with a warning signal that he should set the parking brake. If the parking brake remains in the released condition when the operator vacates the seat 10, switch element 38 remains closed due to the released condition of the parking brake. At the same time, the air pressure switch element 34 closes due to the driver having vacated the seat 10. Thus, both switch elements 34 and 38 are simultaneously closed, and the circuit 32 is then completed to energize the buzzer 36.

Due to the series arrangement of the switch elements 34 and 38, it is necessary for both switch elements to be closed at the same time before the buzzer 36 is energized. Consequently, if the seat 10 is occupied or if the parking brake is set, the buzzer 36 cannot be energized. Only if the parking brake is released at the same time as the seat 10 is unoccupied is the buzzer 36 energized, and this occurs only under the unsafe condition where the driver has failed to properly set the parking brake prior to vacating the cab of the tractor-trailer.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In an over the road tractor having a battery, an operator's seat mounted on an enclosed expansible and collapsible accordion pedestal containing air which is in an expanded state when the operator's seat is vacant and a compressed state when the operator's seat is occupied, and a parking brake having set and release conditions, the improvement comprising:

pressure sensing switch means for the pedestal for sensing when the air in the pedestal is in the expanded state or when the air in the pedestal is in the compressed state, said pressure sensing switch means including a switch element having a closed electrical condition when said switch means senses the expanded state of the air in said pedestal or an open electrical condition when said switch means senses the compressed state of the air in said pedestal;

parking brake sensing means responsive to the condition of the parking brake, said parking brake sensing means including an electrical switch element having a closed electrical condition when the parking brake is in the release condition thereof and an open electrical condition when the parking brake is in the set condition thereof;

electrically actuated warning means for generating a warning signal when energized; and an electrical circuit including the tractor battery and having said warning means and said switch elements of the pressure sensing switch means and the parking brake sensing means arranged in an electrical series relationship therein to energize said warning means whenever both switch elements are simultaneously in the closed condition to complete said circuit.

* * * * *